Oct. 10, 1967　　　　　N. CHAMPION　　　　　3,346,298
SEAT CUSHION
Filed Oct. 31, 1966　　　　　　　　　　　　2 Sheets-Sheet 1
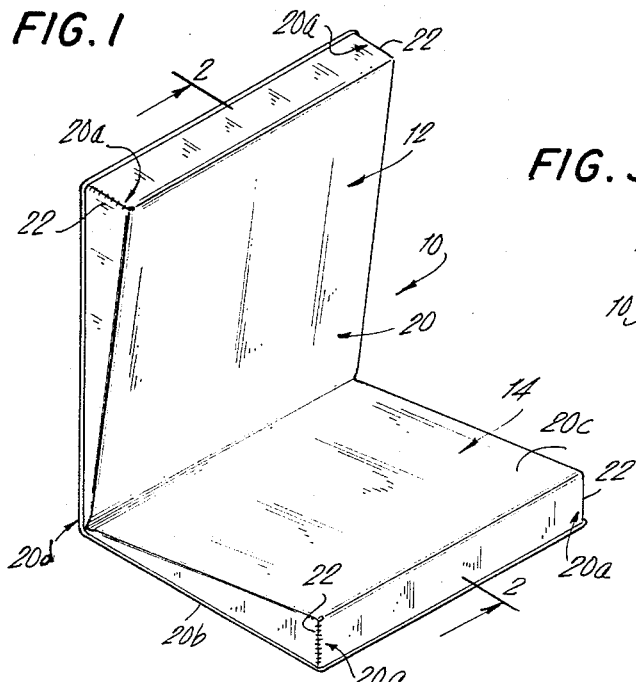
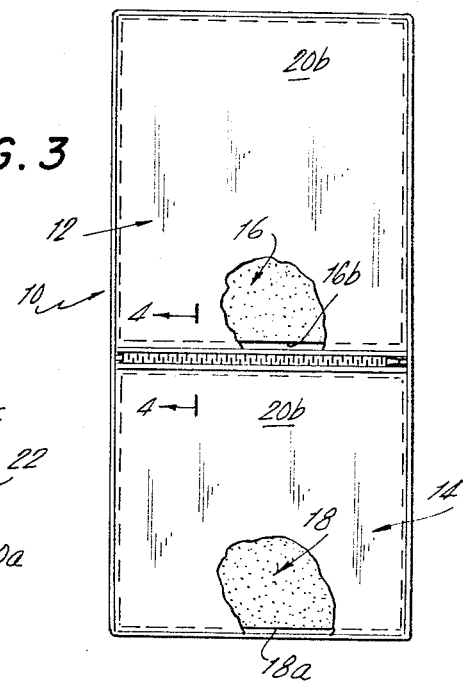
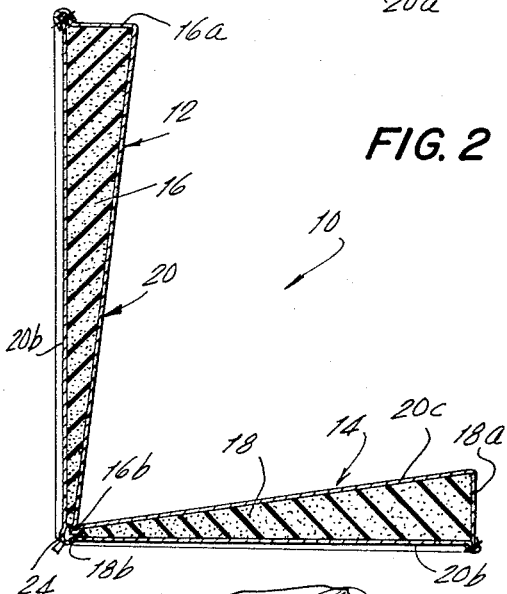
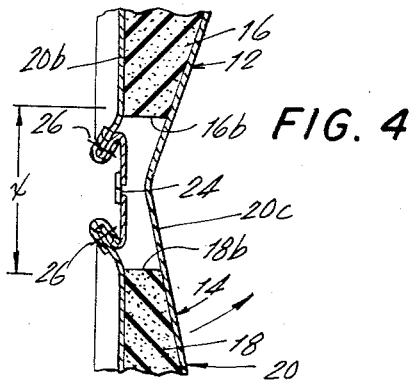
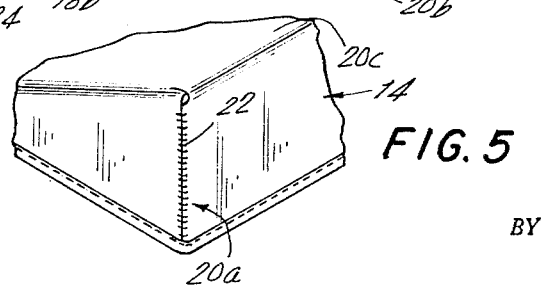
INVENTOR.
NANCY CHAMPION
BY
Amster & Rothstein
ATTORNEYS

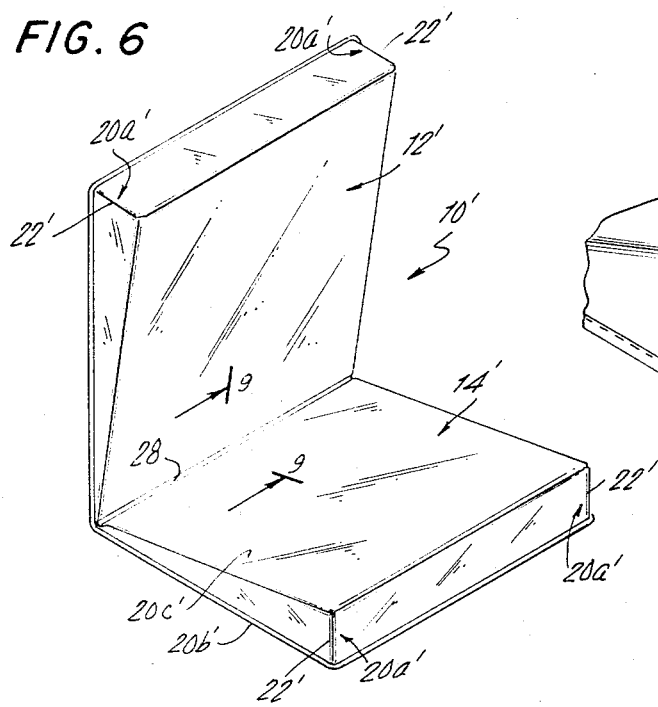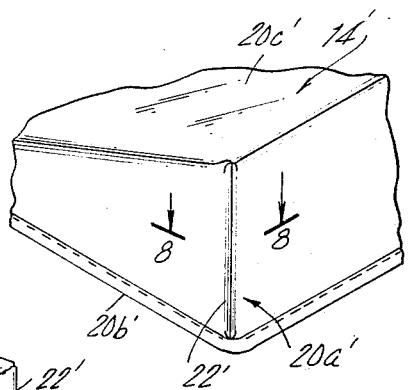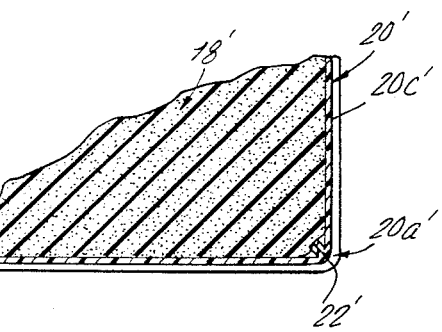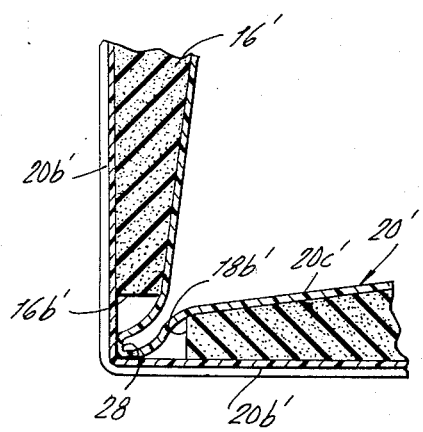

United States Patent Office 3,346,298
Patented Oct. 10, 1967

3,346,298
SEAT CUSHION
Nancy Champion, Beechhurst, N.Y., assignor to Howe
 Plastics & Chemical Co., Inc., New York, N.Y., a corporation of New York
Filed Oct. 31, 1966, Ser. No. 590,845
3 Claims. (Cl. 297—455)

ABSTRACT OF THE DISCLOSURE

A seat cushion having two wedge-shaped foam blocks serving respectively as its seat portion and backrest, wherein the foam blocks are arranged with their wide sides outwardly and their narrow sides facing each other at the juncture of the backrest and seat portion so that a cover enclosing the foam blocks requires corner seams providing a three-dimensional shape only in the areas fitting about the opposite corners of the wide sides of the foam blocks.

---

The present invention relates generally to improvements for a seat cushion and, more particularly, to an improved seat cushion of the type having a backrest portion and a seat portion formed by foam blocks and enclosed within an outer cover.

A commercially acceptable cushion from the vewpoint of comfort can be readily provided by enclosing a foam block within a cushion cover formed either of fabric or vinyl. This, in fact, is the way in which most economically priced cushions are constructed, the cost of manufacture thereof being determined primarily by the thickness of each of the foam blocks and the sewing or heat sealing operations required to provide a properly fitting cover. For a particular price cushion, it is desirable to provide the thickest possible foam block since this, in an obvious manner, promotes the sale of the product. However, the thicker cushion is not only more costly, but also requires additional sewing or heat sealing operations during manufacture of the cover in order to achieve a neat and proper fit for the cover. This is particularly the case with regard to the corners of the comparatively thick foam block where a commercially acceptable appearance requires that the cover be made with corner seams so that it has the three-dimensional shape necessary to fit about the foam block corners. It is undoubtedly because of these reasons that seat cushions with comparatively thick foam blocks are so costly.

Broadly, it is an object of the present invention to provide an improved seat cushion overcoming the foregoing and other shortcomings of the prior art. Specifically, it is an object to provide a seat cushion using foam blocks having a comparatively thick side at each of the outer edges of the cushion to promote comfort in the use thereof and wherein the cover of the cushion is nevertheless capable of being constructed with a minimum of costly sewing or sealing operations and has an unusually neat and trim appearance.

A seat cushion demonstrating objects and advantages of the present invention is of the type having a backrest portion and seat portion, each formed by a wedge-shaped foam block. Both foam blocks are enclosed within a cover such that the comparatively thick sides of each of the blocks form the upper edge of the backrest portion of the cushion and the forward edge of the seat portion of the cushion, respectively. The comparatively narrow sides of the foam blocks are in facing relationship with each other in the medial portion of the cushion. To insure a proper fit of the cover for the cushion, it has been found necessary to provide corner seams in the cover only at the opposite sides of the comparatively thick sides of the foam blocks but not at the foam block corners along the comparatively narrow sides of the blocks. Thus, the cover for the seat cushion, according to the present invention, has only four corner seams and is devoid of any corner seams in the medial portion thereof, thereby being capable of economical manufacture while providing a neat and trim appearance to the seat cushion. Further, the comparatively thick dimension in the foam blocks at the outer edges of the seat cushion has been found to promote comfort in the use of the cushion to almost the same extent as if each of the foam blocks were uniformly thick throughout.

The above brief description, as well as further objects, features and advantages of the present invention, will be more fully appreciated by reference to the following detailed description of presently preferred, but nonetheless illustrative embodiments in accordance with the present invention, when taken in conjunction with the accompanying drawings, wherein:

FIG. 1 is a perspective view of a first embodiment of a seat cushion according to the present invention;

FIG. 2 is an elevational view of this seat cushion embodiment taken in section along line 2—2 of FIG. 1;

FIG. 3 illustrates the seat cushion in an unfolded condition with the backrest and seat portions thereof in the same plane and as seen from the rear to best show details of the zipper thereof;

FIG. 4 is a partial elevational view, on an enlarged scale and in section taken on line 4—4 of FIG. 3, showing further details of the zipper;

FIG. 5 is a partial perspective view, on an enlarged scale, showing details of the stitched corner seam provided in the cover at an outer edge of the seat cushion;

FIG. 6 is a perspective view similar to FIG. 1, but illustrating another embodiment of a seat cushion according to the present invention;

FIG. 7 is a partial enlarged perspective view of a heat sealed corner seam of this seat cushion embodiment;

FIG. 8 is an enlarged plan view, in section taken on line 8—8 of FIG. 7 and looking in the direction of the arrows, illustrating details of the heat sealed corner seam; and FIG. 9 is an elevational view, in section taken on line 9—9 of FIG. 6, illustrating further details of the seat cushion.

Reference is now made to the drawings, and in particular to FIGS. 1–5, illustrating a first embodiment of a seat cushion according to the present invention. The seat cushion, generally designated 10, includes a backrest portion 12 and a seat portion 14. In accordance with the present invention, each of the portions 12 and 14 is formed by triangular or wedge-shaped foam blocks 16 and 18, respectively, which are enclosed within a seat cushion cover 20 which, in the embodiment of FIGS. 1–5, is preferably of fabric. The cover 20 is conventional in most respects with the important exceptions which will now be noted and which constitute essential features of the present invention.

As clearly shown in FIGS. 1–5, except for a slight difference in length, the blocks 16 and 18 are identical in structural features. Taking block 18 by way of example, the same has opposite sides of comparatively wide and narrower extents which in FIG. 2 are respectively designated 18a and 18b. Foam block 16 has similar sides designated 16a and 16b. The wider foam block sides 16a and 18a are located along the outer edges of the seat cushion 10, the wide foam block side 16a forming the upper edge of the backrest portion 12 and the wide foam block side 18a forming the forward edge of the seat portion 14. The facing narrow sides 16b and 18b of the foam blocks are located in the medial portion of the seat cushion 10 being, in a preferred embodiment, spaced about one inch from each other. In such preferred embodiment, the height of the sides 16b, 18b is preferably one inch, while the height of the wider sides 16a and 18a is three inches, the taper of the seat portion 14 being more pronounced because this portion is preferably sixteen inches as compared to a preferred length of twenty inches for the backrest portion 12.

With foam block sides of a height of three inches, as exemplified by the sides 16a and 18a, it is not easy to provide a neat and trim appearance in the areas of the cover 20, more specifically individually and collectively designated 20a, which are coincident with and which are adapted to fit over the side edges of these foam block sides. In fact, to achieve this neat and trim appearance, it is necessary to cut and sew the front cover panel 20c according to a pattern which will provide it with a necessary three-dimensional shape to fit about a foam block edge of this height. This cutting and sewing pattern is well known for cushion cover construction and, for present purposes, it is sufficient to note that it results in a stitched seam 22 being provided along the opposite side edges of each of the sides 16a, 18a. That is, the corner seams 22 which are provided on the seat cushion 10 hereof are conventional in all respects and, although adding to the expense of the manufacture of the seat cushion 10, are necessary in order to provide a neat and trim appearance to the corners 20a of the cover 20. It is significant, however, that the seat cushion 10 hereof is devoid of any corner seams whatsoever in the areas designated 20d which are coincident with the side edges of the narrow sides 16b and 18b of the foam blocks 16, 18.

In accordance with the present invention, the avoidance of corner seams in the areas 20d is due primarily to the tapering down of the foam blocks 16, 18 to the one inch dimension. In this rather nominal size, it has been found unnecessary to specifically tailor or adapt the cover areas to fit about the foam block corners. Thus, without detracting in any substantial manner from the appearance of the seat cushion 10, but at the same time substantially minimizing the cost of manufacture thereof, the seat cushion 10 hereof has only four corner seams 22 which are provided only at the opposite edges of the comparatively wide sides 16a and 18a of the foam blocks 16 and 18, respectively, and has no corner seams at the opposite edges of the narrow foam block sides 16b, 18b.

A further feature and advantage of the wedge shape of the foam blocks 16 and 18 can best be appreciated by reference to FIG. 4. As shown in this figure, the nominal height of one inch of the facing edges 16b and 18b in turn requires only a nominal distance X, which as previously indicated is approximately one inch in a preferred embodiment, in order to provide the necessary clearance for moving the seat cushion portions 12 and 14 relative to each other. This movement is required during placement and adjustment of the cushion 10 in a chair, car seat or the like wherein the backrest portion 12 is oriented essentially vertical and the seat portion 14 essentially horizontal.

As best shown in FIG. 3 in conjunction with FIG. 4, in the portion of the rear panel 20b of the cover 20 which spans the sides 16b and 18b, there is advantageously provided a zipper 24 to facilitate the removal of the foam blocks 16 and 18 from within the cover 20 preparatory to the laundering of the fabric cover 20. The zipper 24 is attached, as by the line of stitching 26, in an opening at the medial portion in the cover rear panel 20b.

Reference is now made to another embodiment of a seat cushion according to the present invention which is shown more particularly in FIGS. 6–9 and in which similar parts are designated by the same but primed reference numerals. The essential difference between the seat cushion 10' and the embodiment just described is that the cover 20' is a heat-sealable vinyl. When using this type of material, there is no need to launder the cover 20' since vinyl is easily wiped clean. Thus, there is no need to provide a zipper in the rear panel 20b' of the cover 20', and the wedge-shaped cushions 16' and 18' are permanently heat sealed within the cover 20' by a line of heat sealing 28 across the medial portion of the seat cushion 10'. In all other respects, the seat cushion 10' is essentially the same as the previously described seat cushion 10. Significantly, the seat cushion 10' also has only four corner seams 22' which in this embodiment are heat sealed rather than being stitched. The cushion 10' is also completely devoid of corner seams at the opposite edges of the facing inner sides 16b' and 18b' of the blocks 16' and 18'.

To provide a neat appearance in each of the heat sealed corner seams 22', and as may be best appreciated from FIG. 8, each of the edges in the cover 20' which abut to form each seam 22' are heat sealed together. The cover at this partial stage of manufacture is then turned inside out to project the raw edges of each seam to the inside of the cover 20'. The front cover panel 20c' is then attached along its periphery to the rear panel 20b', and then the line of heat sealing 28 is applied medially of the seat cushion 10' to hold the foam blocks 16' and 18' in place within the cover 20'.

From the foregoing description, it should be readily appreciated that each exemplary embodiment 10, 10' of a seat cushion as described herein represents a neat and trim appearing product which is capable of being manufactured in a simple and efficient manner wherein complicated sewing or sealing operations have been reduced to a minimum. More particularly, each embodiment requires only four corner seams, 22, 22' at the opposite edges of the prominent visible sides of each, and otherwise is completely devoid of any sewing or heat sealing of corner seams in the medial portion of the seat cushion.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A seat cushion comprising a backrest portion, a seat portion and a cover for said backrest and seat portions, each of said backrest and seat portions being formed by a wedge-shaped foam block having opposite sides thereon of comparatively thick and narrow extents, said foam blocks being arranged with said comparatively thick sides thereof respectively defining an upper edge of said backrest portion and a front edge of said seat portion and with said opposite narrow sides thereof in facing relation closely adjacent each other in the medial area of said seat cushion, and said cover having an operative position enclosing said foam blocks and including corner seams therein only at locations coincident with the corners of said comparatively thick sides for providing a trim fit about said foam blocks, said cover being devoid of any corner seams in the medial portion thereof in areas adjacent the corners of said comparatively narrow sides of said foam blocks and spanning the distance between said foam blocks so as to serve as a hinge about which said backrest and seat portions are movable relative to each other.

2. A seat cushion as defined in claim 1 wherein said cover is fabric and includes a zipper in the area thereof which spans said facing narrow sides of said foam blocks to facilitate the placement within and the removal of said foam blocks from said cover.

3. A seat cushion as defined in claim 2 wherein said cover is fabricated of heat-sealable plastic and including a line of heat sealing in the area thereof which spans said facing narrow sides of said foam blocks to enclose said foam blocks within said cover.

References Cited

UNITED STATES PATENTS

| | | | |
|---|---|---|---|
| 2,229,160 | 1/1941 | Wittcoff | 297—219 X |
| 2,577,949 | 12/1951 | Barrett | 297—382 |
| 2,900,012 | 8/1959 | McGlone | 297—219 |
| 3,024,068 | 3/1962 | Eames | 297—455 |
| 3,092,224 | 6/1963 | O'Neil | 297—377 X |
| 3,205,010 | 9/1965 | Schick | 297—231 X |
| 3,253,861 | 5/1966 | Howard | 297—453 |
| 3,259,925 | 7/1966 | Tilles | 297—378 X |

CASMIR A. NUNBERG, *Primary Examiner.*